(12) United States Patent
Cho et al.

(10) Patent No.: US 10,505,448 B2
(45) Date of Patent: Dec. 10, 2019

(54) BUCK-BOOST CONVERTER USING DELTA-SIGMA MODULATOR

(71) Applicant: ELECTRONICS AND TELECOMMUNICATIONS RESEARCH INSTITUTE, Daejeon (KR)

(72) Inventors: Young Kyun Cho, Daejeon (KR); Myung Don Kim, Daejeon (KR); Seok Bong Hyun, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/198,398

(22) Filed: Nov. 21, 2018

(65) Prior Publication Data
US 2019/0326814 A1    Oct. 24, 2019

(30) Foreign Application Priority Data

Apr. 24, 2018    (KR) .................. 10-2018-0047148

(51) Int. Cl.
*H02M 3/157* (2006.01)
*H02M 1/08* (2006.01)
*H02M 3/158* (2006.01)
*H02M 1/00* (2006.01)

(52) U.S. Cl.
CPC ............. *H02M 3/157* (2013.01); *H02M 1/08* (2013.01); *H02M 3/1582* (2013.01); *H02M 2001/0009* (2013.01)

(58) Field of Classification Search
CPC ..................................................... H02M 3/157
See application file for complete search history.

(56) References Cited

U.S. PATENT DOCUMENTS

| 6,653,960 | B2 | 11/2003 | Mitamura et al. |
| 8,836,309 | B2 | 9/2014 | Chen et al. |
| 9,281,745 | B2 | 3/2016 | Zoso et al. |

(Continued)

FOREIGN PATENT DOCUMENTS

| JP | 2008-099362 A | 4/2008 |
| JP | 2012-253878 A | 12/2012 |

(Continued)

OTHER PUBLICATIONS

Yasunori Kobori et al., "Noninverted Buck-Boost Converters with Dual Delta Sigma Modulators", Electrical Engineering in Japan, vol. 178, No. 2, 2012.

*Primary Examiner* — Jue Zhang
*Assistant Examiner* — Trinh Q Dang
(74) *Attorney, Agent, or Firm* — LRK Patent Law Firm

(57) ABSTRACT

A buck-boost converter using a delta-sigma modulator (DSM) includes a buck-boost mode driving circuit configured to receive an input voltage and output an output voltage according to an operation mode, a mode controller configured to sense an output of the buck-boost mode driving circuit and determine the operation mode, and a gate driver configured to receive a mode determination signal for determining the operation mode from the mode controller and control switches included in the buck-boost mode driving circuit. Accordingly, output ripple characteristics thereof can be improved.

16 Claims, 14 Drawing Sheets

(56) References Cited

U.S. PATENT DOCUMENTS

| | | | |
|---|---|---|---|
| 2008/0303501 A1* | 12/2008 | Prodic | H02M 3/157 323/283 |
| 2010/0079323 A1* | 4/2010 | Miao | H02M 3/157 341/142 |
| 2013/0093407 A1 | 4/2013 | Heo et al. | |
| 2014/0064355 A1 | 3/2014 | Cho et al. | |
| 2014/0152272 A1 | 6/2014 | Bazzani et al. | |
| 2015/0109157 A1* | 4/2015 | Caldwell | H03M 3/458 341/143 |
| 2016/0049947 A1* | 2/2016 | Adachi | H03L 7/189 327/159 |
| 2017/0077817 A1* | 3/2017 | Houston | H02M 3/1582 |
| 2018/0062525 A1* | 3/2018 | Radic | H02M 1/08 |
| 2018/0171976 A1* | 6/2018 | Tan | F03D 7/0272 |
| 2018/0358900 A1* | 12/2018 | Sun | H02M 3/1582 |

FOREIGN PATENT DOCUMENTS

| | | |
|---|---|---|
| KR | 10-0771854 B1 | 11/2007 |
| KR | 10-2013-0076967 A | 7/2013 |

\* cited by examiner

BUCK-BOOST CONVERTER USING DELTA-SIGMA MODULATOR

CROSS REFERENCE TO RELATED APPLICATION

This application claims priority to Korean Patent Application No. 10-2018-0047148, filed Apr. 24, 2018 in the Korean Intellectual Property Office (KIPO), the entire content of which is hereby incorporated by reference.

BACKGROUND

1. Field of the Invention

Example embodiments of the present invention relate to a buck-boost converter using a delta-sigma modulator (DSM), and more specifically, to a method and apparatus for reducing an output harmonic of a direct current (DC)-DC convertor and obtaining improved operating characteristics by forming a non-inverting buck-boost converter using a 1-bit or 1.5-bit DSM.

2. Description of Related Art

Battery-operated portable electronic products such as portable phones and laptops have been tremendously developed over recent years. In order to increase an operating time of the portable electronic product, a life time of a battery has to be increased through an effective power management circuit. One of the best strategies to effectively use a total battery capacity is to use a buck-boost converter in the power management circuit.

The buck-boost converter is a convertor configured to output a target voltage even when an input voltage is high or low. Specifically, the buck-boost converter is a convertor in which a buck converter which is a direct current (DC)-DC convertor configured to decrease a voltage and a boost converter which is a DC-DC convertor configured to increase a voltage are combined, and has operation modes including a buck mode in which the buck-boost converter operates as a buck converter and a boost mode in which the buck-boost converter operates as a boost converter.

In addition, the buck-boost converter is classified as a non-inverting buck-boost converter which outputs a positive voltage or an inverting buck-boost converter which outputs a negative voltage. Here, the buck-boost converter includes at least two switches for each operation mode in order to switch the operation mode, and such a switch control causes switching loss and conduction loss.

Conventionally, converters such as a single-ended-primary-inductance converter (SEPIC), a Cuk converter, and the like are proposed in order to convert power in a buck-boost manner. However, since each of the above-described converters should use one or more inductors and capacitors and has a structure of the inverting buck-boost converter configured to output a negative voltage, it is difficult to directly apply the above-described converters to general portable electronic products.

In addition, although conventional studies have proposed methods in which the number of the switches, in which states thereof are changed during one operating cycle, is minimized to improve the switching loss and the conduction loss, a harmonic may be generated due to switching, and there are many, cases in which complex control circuits, additional filters, regulators, and the like are required.

Accordingly, a method in which a complex control circuit and additional components are not required and a relatively simple mode control circuit is used in the buck-boost converter in order to reduce a circuit area and cost and to improve performance is needed.

SUMMARY

Accordingly, example embodiments of the present invention are provided to substantially obviate one or more problems due to limitations and disadvantages of the related art.

Example embodiments of the present invention provide a buck-boost converter using a delta-sigma modulator (DSM).

The buck-boost converter using a delta-sigma modulator (DSM) may comprises a buck-boost mode driving circuit configured to receive an input voltage and output an output voltage according to an operation mode, a mode controller configured to sense to an output of the buck-boost mode driving circuit and determine the operation mode and a gate driver configured to receive a mode determination signal for determining the operation mode from the mode controller and control switches included in the buck-boost mode driving circuit.

The mode controller may include a DSM configured to generate the mode determination signal with a digital signal according to the output of the buck-boost driving circuit.

The buck-boost mode driving circuit may include a plurality of switches switched to change the output voltage according to the operation mode.

The buck-boost mode driving circuit may include a first switch in which the input voltage is applied to one end and an inductor is connected to the other end, a fourth switch in which one end is connected to the inductor and the other end is connected to a first contact point, a second switch in which one end is connected to a contact point between the first switch and, the inductor and the other end is connected to the ground, a third switch in which one end is connected to a contact point between the inductor and the fourth switch and the other end is connected to the ground, a load resistor in which one end is connected to the ground and the other end is connected to the first contact point so that the output voltage is applied and a capacitor connected to the output resistor in parallel.

The mode controller may include an output sensor configured to sense the output voltage of the buck-boost mode driving circuit and output a feedback voltage.

The feedback voltage is determined by multiplying the output voltage by a preset gain.

The DSM may generate a digital signal for adjusting an ON or OFF time of each of the plurality of switches on the basis of the feedback voltage.

The DSM may generate the digital signal with 1-bit or 1.5-bits and outputs the digital signal.

The DSM may sense a current flowing through the inductor or the load resistor and variably adjusts an order and a sampling frequency.

The mode controller may include a compensator configured to compensate the feedback voltage on the basis of a reference voltage and transmit the compensated feedback voltage to an input of the DSM.

The compensator may include a dual mode compensator in which independent circuits perform compensation of a discontinuous conduction mode (DCM) and compensation of a continuous conduction mode (CCM).

In a case in which the digital signal is a 1-bit digital signal, the mode controller may further include a duo-binary encoder configured to receive the 1-bit digital signal and output the mode determination signal with a binary code.

The duo-binary encoder may combine the 1-bit digital signal and a delayed signal in which the 1-bit digital signal is delayed by one clock to generate a binary code indicating one among 00, 01, 10, and 11, and output the mode determination signal based on the generated binary code.

The duo-binary encoder may include an AND gate configured to perform an AND operation on the 1-bit digital signal and the delayed signal and output a signal for driving a buck mode and a NOR gate configured to perform a NOR operation on the 1-bit digital signal and the delayed signal and output a signal for driving a boost mode.

When the binary code is 11, the gate driver may control the plurality of switches such that the buck-boost driving circuit operates in a buck mode.

When the binary code is 10 or 01, the gate driver may control the plurality of switches such that the buck-boost driving circuit maintains an operating buck-boost mode.

When the binary code is 00, the gate driver may control the plurality of switches such that the buck-boost driving circuit operates in a boost mode.

Example embodiments of the present invention also provide a mode control circuit configured to control a buck-boost mode driving circuit configured to receive an input voltage and output an output voltage according to an operation mode.

The mode control circuit for the buck-boost mode driving circuit comprises an output sensor configured to sense an output voltage of the buck-boost mode driving circuit and output a feedback voltage, a compensator configured to compensate the feedback voltage on the basis of a reference voltage and output the compensated feedback voltage and a delta-sigma modulator (DSM) configured to generate a digital, signal for determining the operation mode on the basis of an output signal of the compensator.

The DSM may generate the digital signal with a 1-bit or 1.5-bits and outputs the digital signal.

In a case in which the digital signal includes a 1-bit digital signal, the mode control circuit may further include a duo-binary encoder configured to receive the 1-bit digital signal and output the 1-bit digital signal with a binary code.

The duo-binary encoder may combine the 1-bit digital signal and a delayed signal in which the 1-bit digital signal is delayed by one clock, to generate a binary code indicating one among 00, 01, 10, and 11

BRIEF DESCRIPTION OF DRAWINGS

Example embodiments of the present invention will become more apparent by describing in detail example embodiments of the present invention with reference to the accompanying drawings, in which.

DETAILED DESCRIPTION OF EXAMPLE EMBODIMENTS

Figure 1A:
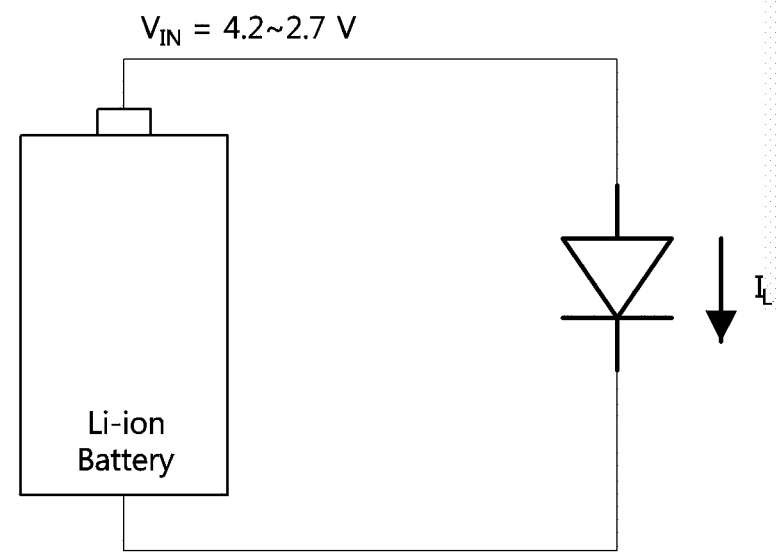
FIGS. 1A and 1B are schematic views for describing characteristics of a general power source management circuit.

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1B:
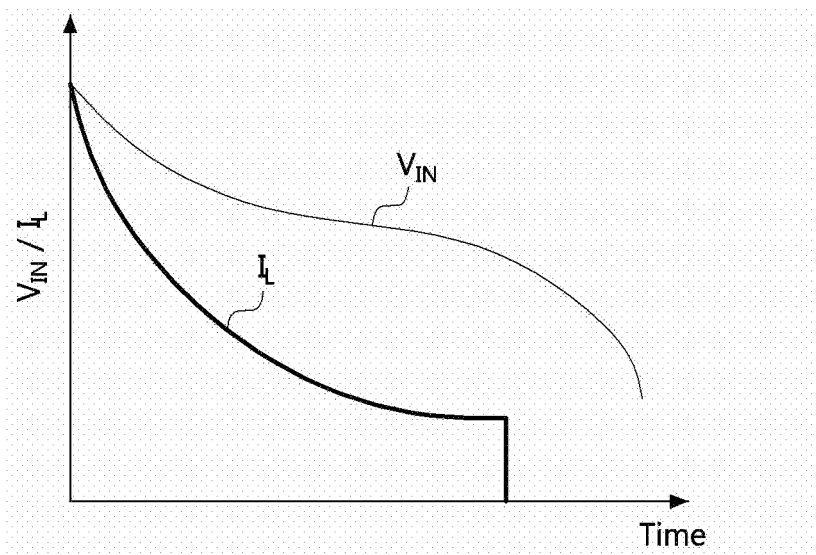
Figure 2A:
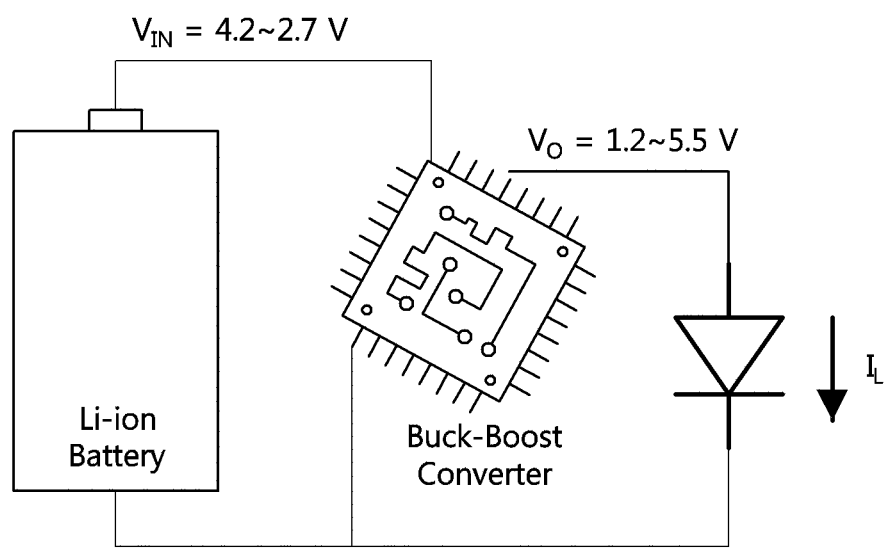
FIGS. 2A and 2B are schematic views for describing characteristics of a power source management circuit including a buck-boost converter.
Figure 2B:
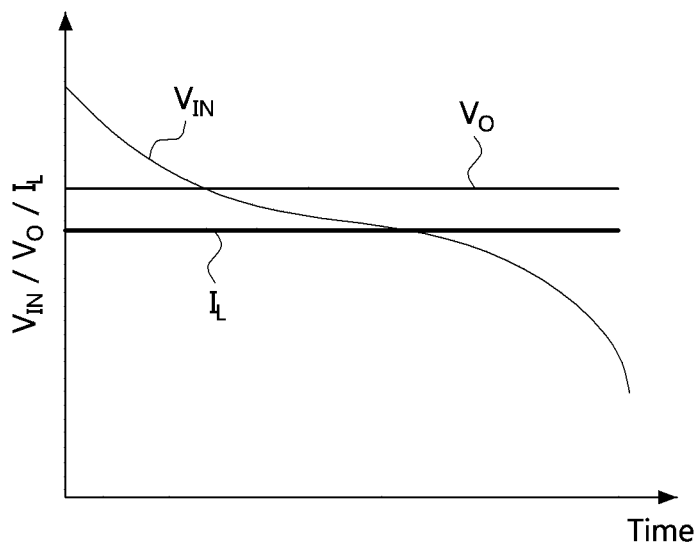

FIGS. 1A and 1B are schematic views for describing characteristics of a general power source management circuit. FIGS. 2A and 2B are schematic views for describing characteristics of a power source management circuit including a buck-boost converter.

Referring to FIG. 1A, a circuit in which an output of a battery is connected to a diode when a general Li-ion battery is used can be seen. Here, in a case in which the Li-ion battery is discharged, an output current $I_L$ flowing through the diode continuously decreases, and when a voltage YIN of the battery becomes less than or equal to a predetermined voltage, the output current no longer flows.

Referring to FIG. 1B, in a case in which the voltage $V_{IN}$ of the Li-ion battery of FIG. 1A decreases from 4.2 V to 2.7 V, it can be seen that the output current sharply decreases at a specific moment and no longer flows.

Referring to FIG. 2A, it can be seen that a circuit in which a buck-boost converter is installed in addition to the Li-ion battery of FIG. 1 manages power. That is, even when a voltage $V_{IN}$ of the Li-ion battery decreases from 4.2 V to 2.7 V, the buck-boost converter may convert the voltage $V_{IN}$ supplied from the Li-ion battery and may continuously supply a stable voltage Vo ranging from 1.2 V to 5.5 V to a diode.

Referring to FIG. 2B, voltages and currents of the components of FIG. 2A can be seen. Even when the voltage $V_{IN}$ of the Li-ion battery decreases, it can be seen that the buck-boost converter provides the predetermined output voltage Vo to the diode, and accordingly, a current $I_L$ flowing through the diode is also stably maintained.

That is, using the buck-boost converter may be a method for effectively managing power of a battery.

Figure 3A:
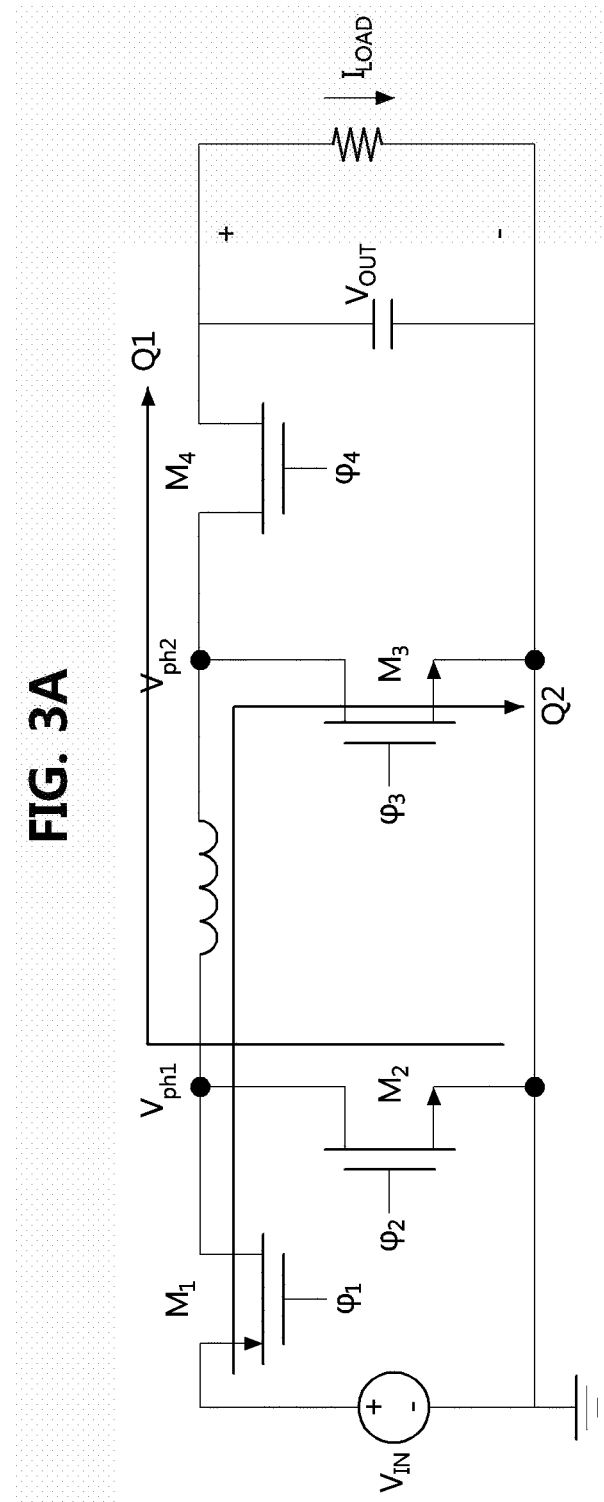
FIG. 3A is a circuit diagram illustrating anon-inverting buck-boost converter.
Figure 3B:
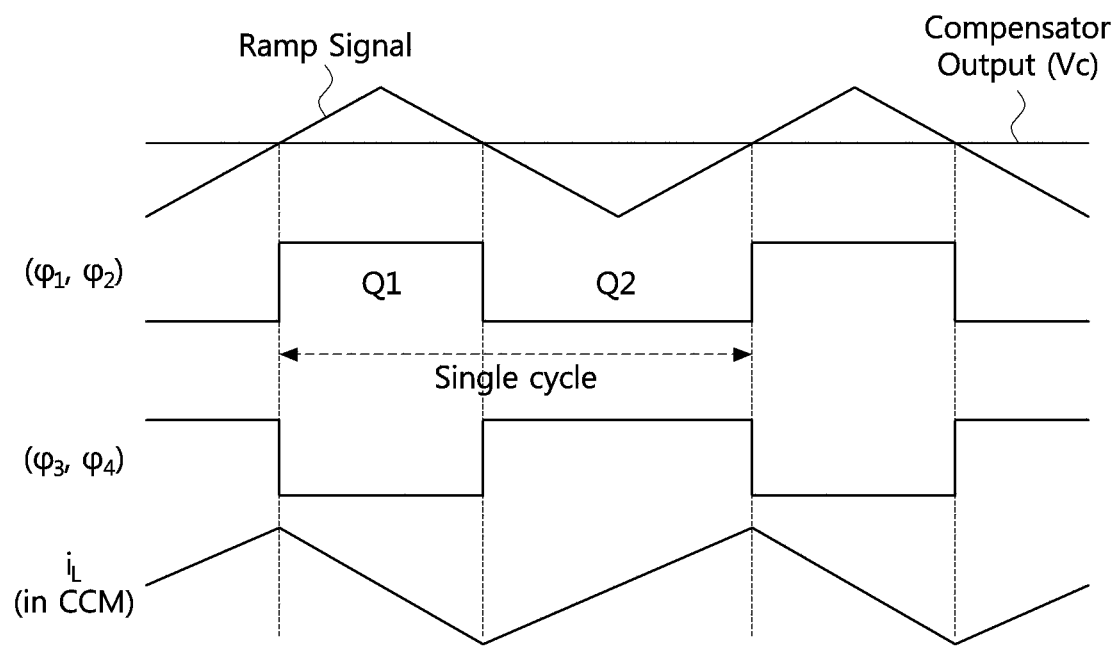
FIG. 3B is a schematic view for describing operating characteristics of the non-inverting buck-boost converter of FIG. 3A.

FIG. 3A is a circuit diagram illustrating a non-inverting buck-boost converter. FIG. 3B is a schematic view for describing operating characteristics of the non-inverting buck-boost converter of FIG. 3A.

Referring to FIG. 3A, a circuit related to a non-inverting buck-boost converter operated in two phases can be seen. Two phase operations may be performed according to a current flowing according to a clock Q1 and a clock Q2. First, during the clock Q1, switches $M_2$ and $M_4$ are turned on to supply power to an output while decreasing an output current $I_{LOAD}$. During the clock Q2, switches $M_1$ and $M_3$ are turned on to charge an inductor (interposed between $V_{ph1}$ and $V_{ph2}$) while increasing the output current $I_{LOAD}$. By repeating the two phase operations, the non-inverting buck-boost converter constantly, maintains the output voltage $V_{OUT}$.

Referring to FIG. 3B, states of four switches $M_1$, $M_2$, $M_3$, and $M_4$ (of which switching clocks are respectively $\varphi_1$, $\varphi_2$, $\varphi_3$, and $\varphi_4$) are changed once during a single cycle, and thus the efficiency of the converter decreases because a switching loss occurs two times that of a buck converter using only the switches $M_1$ and $M_2$ or a boost converter using only the switches $M_3$ and $M_4$.

In addition, it can be seen that a conduction loss of the non-inverting buck-boost converter of FIGS. 3A and 3B also greatly increases. In the case of the buck converter in which only the switches $M_1$ and $M_2$ are switched or a buck mode (the switch $M_3$ is maintained in an "OFF" state and the switch $M_4$ is maintained in an "ON" state), since one end of the inductor is connected to the output, an average inductor current $I_{Lbuck,ave}$ flowing through the inductor is the same as the output current $I_{LOAD}$ ($I_{Lbuck,ave}=I_{LOAD}$). In addition, in the case of the boost converter in which only the switches $M_3$ and $M_4$ are operated or a boost mode (the switch $M_1$ is maintained in an "ON" state and the switch $M_2$ is maintained in an "OFF" state), the output current $I_{LOAD}$ is proportional to a duty ratio D. A relations between the duty ratio D, the output current $I_{LOAD}$, and the average inductor current $I_{Lboost,ave}$ may be defined by following Equation 1.

$$I_{Lboost,ave} = \frac{I_{LOAD}}{1-D} \quad \text{[Equation 1]}$$

Figure 4A:
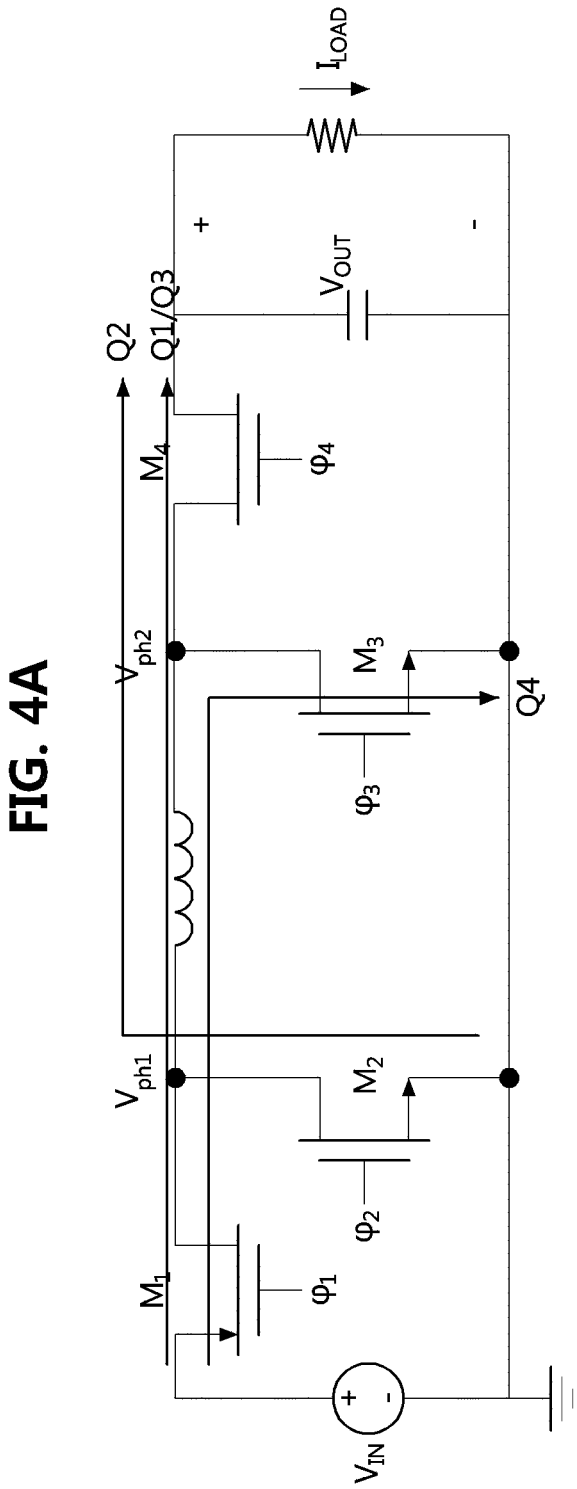
FIG. 4A is a circuit diagram illustrating a non-inverting buck-boost converter operated in three phases.
Figure 4B:
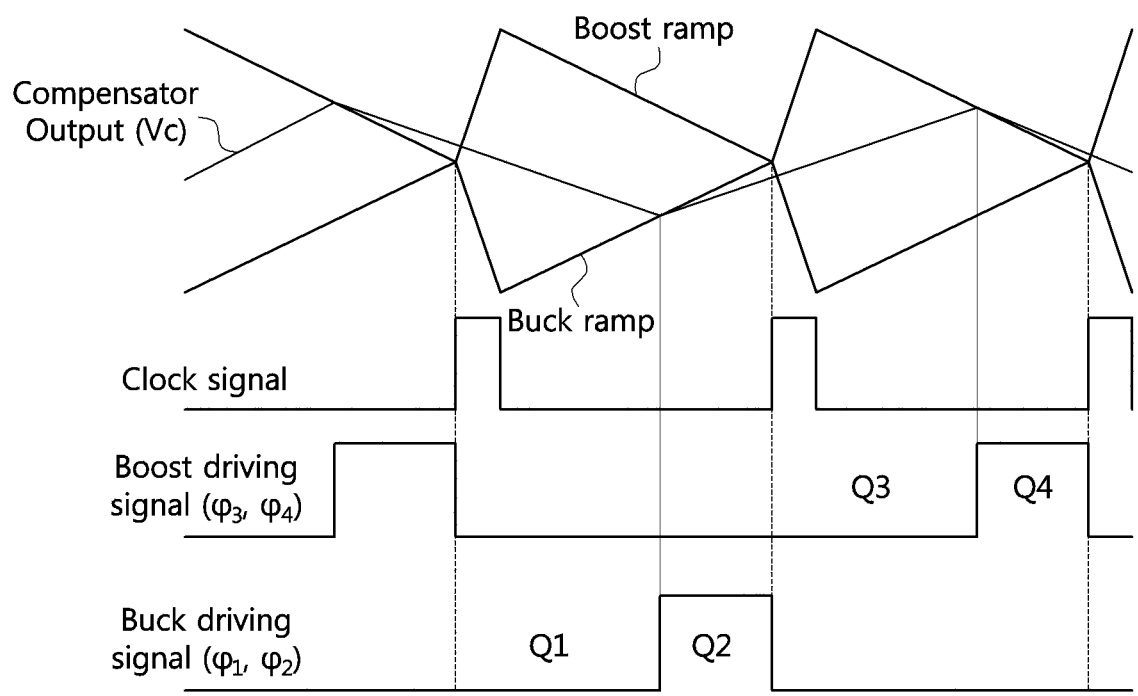
FIG. 4B is a schematic view for describing operating characteristics of the three-phase non-inverting buck-boost converter of FIG. 4A.
Figure 5:
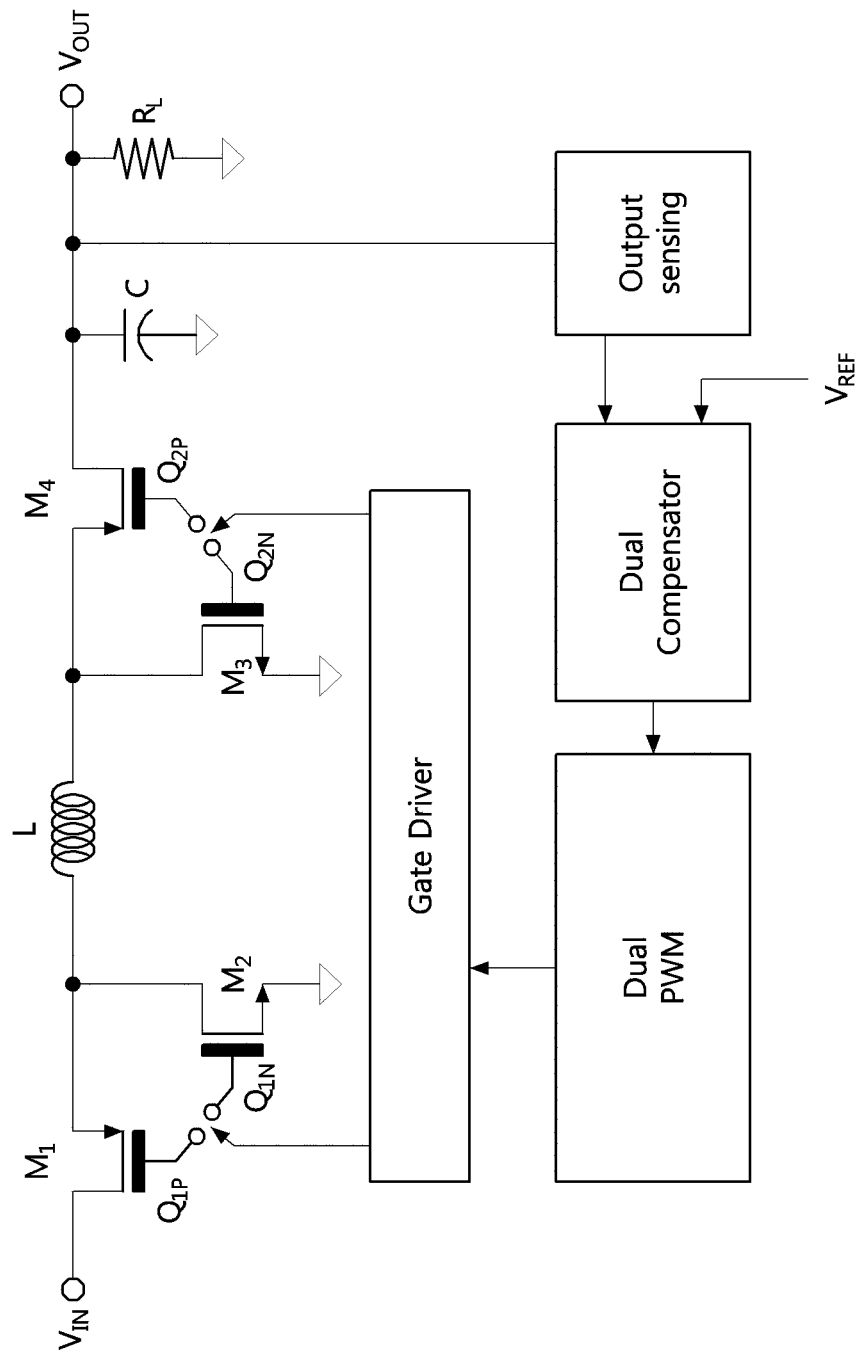
FIG. 5 is a configurational diagram of a three-phase non-inverting buck-boost converter configured to perform a switching control.

That is, in a case in which the duty ratio D is greater than zero, a value of the average inductor current $I_{Lboost,ave}$ is greater than that of the output current $I_{LOAD}$. Such a trend is also the same in a two-phase buck-boost converter. Particularly, because the duty ratio D is 0.5 when an input voltage is close to an output voltage in the two-phase buck-boost converter, $I_{LBB,ave}=2 \times I_{LOAD}$. The conduction loss is proportional to a root mean square (rms) of the inductor current, and thus when an average inductor current is doubled, the conduction loss of the buck-boost converter is inevitably doubled, FIG. 4A is a circuit diagram illustrating a non-inverting buck-boost converter operated in three phases. FIG. 4B is a schematic view for describing operating characteristics of the three-phase non-inverting buck-boost converter of FIG. 4A. FIG. 5 is a configurational diagram of a three-phase non-inverting buck-boost converter Including a configuration configured to perform a switching control.

In order to reduce the switching and conduction losses generated in the non-inverting buck-boost converter of FIGS. 3A and 3B, a buck-boost converter operated in three phases was proposed (IEEE Trans. Power Electronics, Vol. 27, No. 12, pp. 4934-4942, 2012, Design of an Average- Current-Mode Non-inverting Buck-Boost DC-DC Converter with Reduced Switching and Conduction Losses).

Referring to FIG. 4B, the three-phase buck-boost converter uses two ramp signals Boost ramp and Buck ramp. One signal Buck ramp of the two ramp signals is used to adjust buck mode switches $M_1$ and $M_2$ in FIG. 4A, and the other signal Boost ramp is used to adjust boost mode switches $M_3$ and Ma. In addition, operations of the modes are performed at points at which an output signal Vc of a compensator meets the ramp signals as illustrated in FIG. 4B.

Referring to FIGS. 4A and 4B, the three-phase buck-boost converter has three states including a first state of flows Q1 and Q3, a second state of a flow Q2, and a third state of a flow Q4 according to switching, operations thereof. Referring to FIG. 4B, when a clock signal becomes high, both of a boost driving signal and a buck driving signal are reset, only the switches $M_1$ and $M_4$ are turned on at this time, and an input signal is transmitted to an output (a phase Q1 or Q3), This state is a mode which does not exist in the non-inverting buck-boost converter of FIGS. 3A and 3B. Next, when the clock signal becomes low, and the output signal Vc of the compensator meets the signal Buck ramp, the buck driving signal becomes high, and the three-phase buck-boost converter operates in a buck mode (phase Q2). In this state, the boost driving signal does change. Finally, when the clock signal is low, and the output signal Vc of the compensator meets the signal Boost ramp, the boost driving signal becomes high, and thus the three-phase buck-boost converter operates in a boost mode (phase Q4).

Simply, it can be seen that the switching operation is performed only for the buck mode (phase Q1 or Q2) or boost, mode (phase Q3 or Q4) within each cycle. Since states of only two switches (among four switches) are changed within one cycle, the three-phase buck-boost converter having three states may reduce the switching loss of the switching operation to half of that of the general buck-boost converter of FIGS. 3A and 3B. In addition, as the input voltage approaches the output voltage, it can be expected that the three-phase buck-boost converter alternately operates between the buck mode and the boost mode. Accordingly, when the input voltage is close to the output voltage, the average inductor current in the buck mode or the boost mode is described by following Equation 2.

$$I_{L,ave} = \frac{I_{Lbuck,ave} + I_{Lboost,ave}}{2} = I_{LOAD} \quad \text{[Equation 2]}$$

Referring to Equation 2, it can be seen that an average $I_{L,ave}$ of an average inductor current $I_{Lbuck,ave}$ in the buck mode and an average inductor current $I_{Lboost,ave}$ in the boost mode is the same as the output current $I_{LOAD}$. Accordingly, since an amount of current flowing through the inductor can be reduced to half of an amount of current of the buck-boost converter of FIGS. 3A and 3B, the three-phase buck-boost converter may reduce the conduction loss. For reference, in a case in which the input voltage becomes the same as the output voltage in the boost mode, since the duty ratio D is zero, the average current $I_{Lboost,ave}$ in the boost mode becomes the same as the output current $I_{LOAD}$.

Meanwhile, the three-phase non-inverting buck-boost converter of FIGS. 4A and 4B also has problems to be overcome.

First, since one cycle of the three-phase non-inverting buck-boost converter is generated by a clock, in an output spectrum of a direct current (DC)-DC convertor, a high output spike is generated at a frequency of an order which is an integral multiple of a switching frequency, and such a switching harmonic is coupled to a load through a power line so that performance of the system deteriorates. Since a separate electromagnetic interference (EMI) filter has to be mounted on a board in order to remove the switching harmonic, it causes an increase in total system cost.

Second, since the three-phase non-inverting buck-boost converter needs a dual loop control circuit such that the three-phase non-inverting buck-boost converter is independently used in the buck and boost modes, two sets of compensator circuits have to be used. Referring to FIG. 5, a dual compensator and a loop for controlling the buck mode and the boost mode increase the degree of difficulty of entire circuit design and an area thereof to increase a cost.

Third, since the three-phase non-inverting buck-boost converter is operated only in the buck mode or boost mode, the mode has to be determined according to relations between the input voltage, the output voltage, and the duty cycle. Referring to FIG. 5, it can be seen that an output is sensed by a sensor (for output sensing) configured to sense an output terminal, and the switch control is performed through the loop. As described above, the complex control circuit, the additional compensation circuit, and a correction circuit are needed to determine the mode of the converter. Particularly, since symmetric ramp signals have to be generated in the buck and boost modes, there are big constraints to realize the converter.

Fourth, since the three-phase non-inverting buck-boost converter is operated based on pulse width modulation (PWM), a maximum duty cycle is restricted due to discontinuity caused by a PWM comparator when the mode is changed, thereby causing pulse skipping and causing a big ripple in the output voltage. Referring to FIG. 5, it can be seen that a circuit for dual PWM is included in the three-phase non-inverting buck-boost converter, and an additional circuit such as a low drop-out (LDO) linear regulator is required to restrict a ripple of maximum 100 mV.

Figure 6:
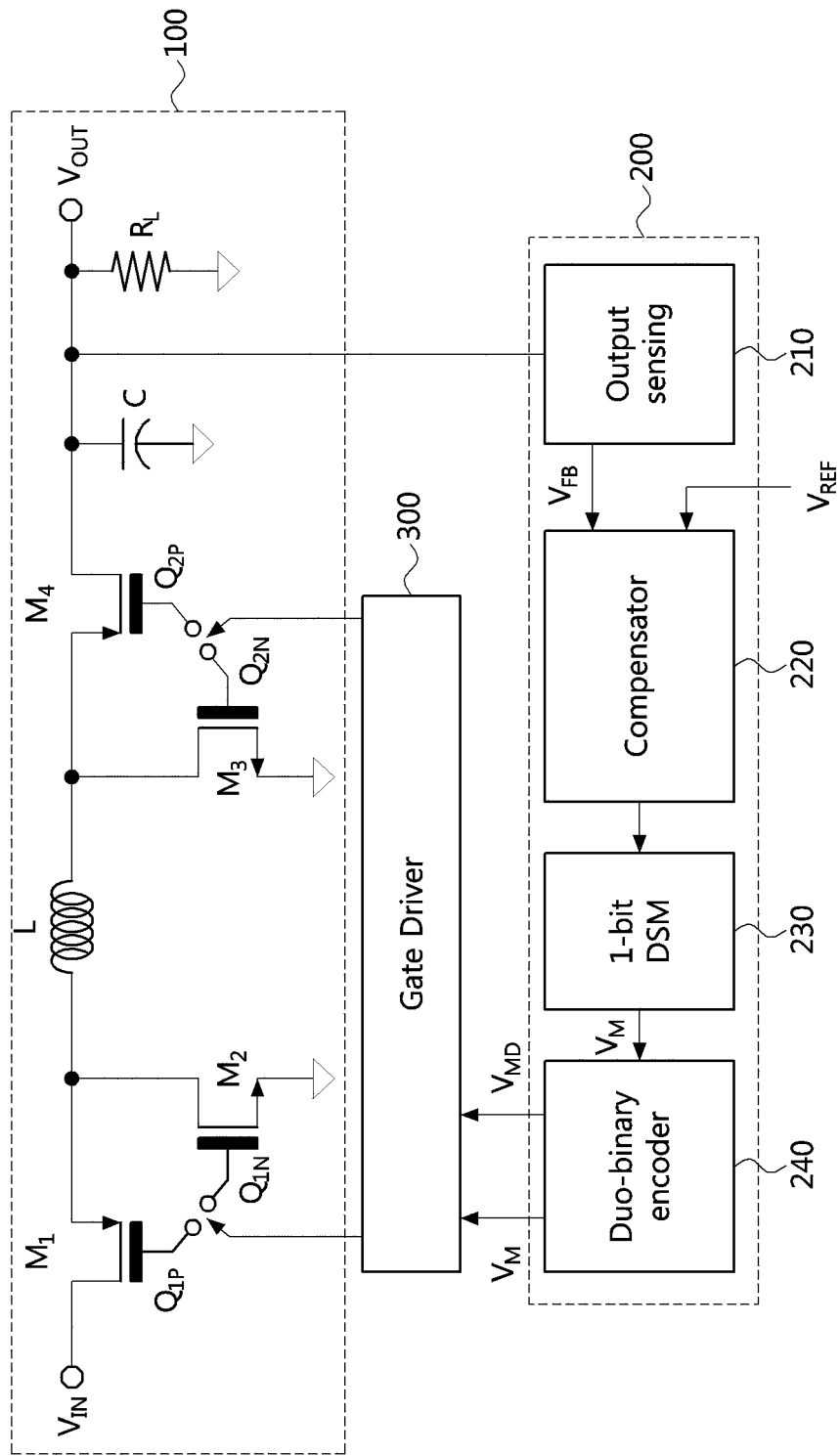
FIG. 6 is a configurational diagram illustrating a buck-boost converter using a delta-sigma modulator (DSM) according to one embodiment of the present invention.

FIG. 6 is a configurational diagram illustrating a buck-boost, converter using a delta-sigma modulator (DSM) according to one embodiment of the present invention.

Referring to FIG. 6, a buck-boost converter using a DSM may include a buck-boost mode driving circuit 100 configured to receive an input voltage and output an output, voltage according to an operation mode, a mode controller 200 configured to sense an output of the buck-boost mode driving circuit 100 to determine the operation mode, and a gate driver 300 configured to receive a mode determination signal for determining the operation mode from the mode controller 200 and control switches included in the buck-boost mode driving circuit 100. Here, the buck-boost converter using the DSM may be the non-inverting buck-boost converter illustrated in FIG. 5. In addition, the operation mode may include at least one among a buck mode, a boost mode, and a mode which maintains an existing state.

Here, the buck-boost mode driving circuit 100 may include a plurality of switches $M_1$ to $M_4$ switched such that the output voltage is changed according to the operation mode.

Here, the buck-boost mode driving circuit 100 may include a first switch $M_1$ and a second switch $M_2$ which operate in the buck mode, and a third switch $M_3$ and a fourth switch $M_4$ which operate in the boost mode.

More specifically, the buck-boost mode driving circuit 100 may include the first switch $M_1$ in which the input voltage $V_{IN}$ is applied to one end and an inductor L is connected to the other end, the fourth switch $M_4$ in which one end is connected to the inductor L and the other end is connected to a first contact point $V_{OUT}$, the second switch $M_2$ in which one end is connected to a contact point between the first switch $M_1$ and the inductor L and the other end is connected to the ground, the third switch $M_3$ in which one end is connected to a contact point between the inductor L and the fourth switch $M_4$ and the other end is connected to the ground, a load, resistor $R_L$ in, which one end is connected to the ground and the other end is connected to the first contact point so that the output voltage $V_{OUT}$ is applied, and a capacitor C connected to the output resistor $R_L$ in parallel.

Here, diodes may be used instead of the second switch $M_2$ and the fourth switch $M_4$. In a case in which the second switch $M_2$ and the fourth switch $M_4$ are substituted by the diodes, the buck-boost driving circuit 100 may drive only the first switch $M_1$ and the third switch $M_3$.

Here, the mode controller 200 may include an output sensing 210 configured to sense the output voltage of the buck-boost mode driving circuit 100 to output a feedback voltage $V_{FB}$. Here, the feedback voltage $V_{FB}$ may be determined by multiplying the output voltage by a preset gain.

Here, the mode controller 200 may include a compensator 220 configured to compensate the feedback voltage $V_{FB}$ on the basis of a reference voltage $V_{REF}$ and output the compensated feedback voltage $V_{FB}$. Accordingly, in order to check a level of the output voltage $V_{OUT}$ with respect to the reference voltage $V_{REF}$, the feedback voltage $V_{FB}$ in, which the output voltage $V_{OUT}$ is multiplied by the preset gain and the reference voltage $V_{REF}$ for checking the level of the output voltage $V_{OUT}$ may be input to the compensator 220.

Here, the compensator 220 may be a dual mode compensator in which independent circuits perform compensation of a discontinuous conduction mode (DCM) and compensation of a continuous conduction mode (CCM). The DCM may mean that a load current of the buck-boost mode driving circuit 100 (for example, a current flowing through the load resistor $R_L$) continuously flows, and the CCM may mean that the load current of the buck-boost mode driving circuit 100 discontinuously flows. Accordingly, a current sensing circuit (or a current meter) may be further included in the mode controller 200 in order to determine the DCM or CCM.

Here, the mode controller 200 may include a DSM 230 configured to generate the mode determination signal into a digital signal according to an output of the buck boost driving circuit 100. More specifically, the DSM 230 may receive an output of the compensator 220 and generate the digital signal for adjusting an ON or OFF time of each of the plurality of switches on the basis of the feedback voltage $V_{FB}$ (or a difference value between the feedback voltage and the reference voltage $V_{REF}$).

Here, the DSM 230 may generate the digital signal with 1 or 1.5-bits and output the digital signal.

Here, the DSM 230 may be a reconfigured DSM configured, to sense a current flowing through the inductor L or the load resistor Rl, to variably adjust an order and a sampling frequency. When the DSM in which the order and the sampling frequency are dynamically changed is used, the ripple characteristics and efficiency of the output voltage can be improved.

Here, in a case in which the digital signal is a 1-bit digital signal, a duo-binary encoder may be further needed in order to control all the switches for the buck mode and the boost mode using a 1-bit signal.

Accordingly, in the case in which the digital signal is the 1-bit digital signal, the mode controller 200 may further include a duo-binary encoder 240 configured to receive the 1-bit digital signal and output the mode determination signal with a binary code.

Here, the duo-binary encoder 240 may combine 1-bit digital signal $V_M$ and a delayed signal $V_{MD}$ in which the 1-bit digital signal is delayed by one clock to generate a binary code indicating one among 00, 01, 10, and 11, and may output the mode determination signal on the basis of the generated binary code.

Here, the duo-binary encoder 240 may include an AND gate configured to perform an AND operation on the 1-bit digital signal $V_M$ and the delayed signal $V_{MD}$ to output a signal for performing the buck mode and a NOR gate configured to perform a NOR operation on the 1-bit digital signal $V_M$ and the delayed signal $V_{MD}$ and output a signal for performing the boost mode.

Here, when the mode determination signal is generated by the mode controller 200, the gate driver 300 may adjust the generated mode determination signal to not overlap a driving waveform, and drive the plurality of switches $M_1$ to $M_4$ included in the buck-boost driving circuit 100.

Here, when the binary code is 11, the gate driver 300 may control the plurality of switches such that the buck-boost driving circuit is operated in the buck mode.

Here, when the binary code is 10 or 01, the gate driver 300 may control the plurality of switches such that the buck-boost driving circuit maintains an operating buck-boost mode.

Here, when the binary code is 00, the gate driver 300 may control the plurality of switches such that the buck-boost driving circuit operates in the boost mode.

Figure 7:
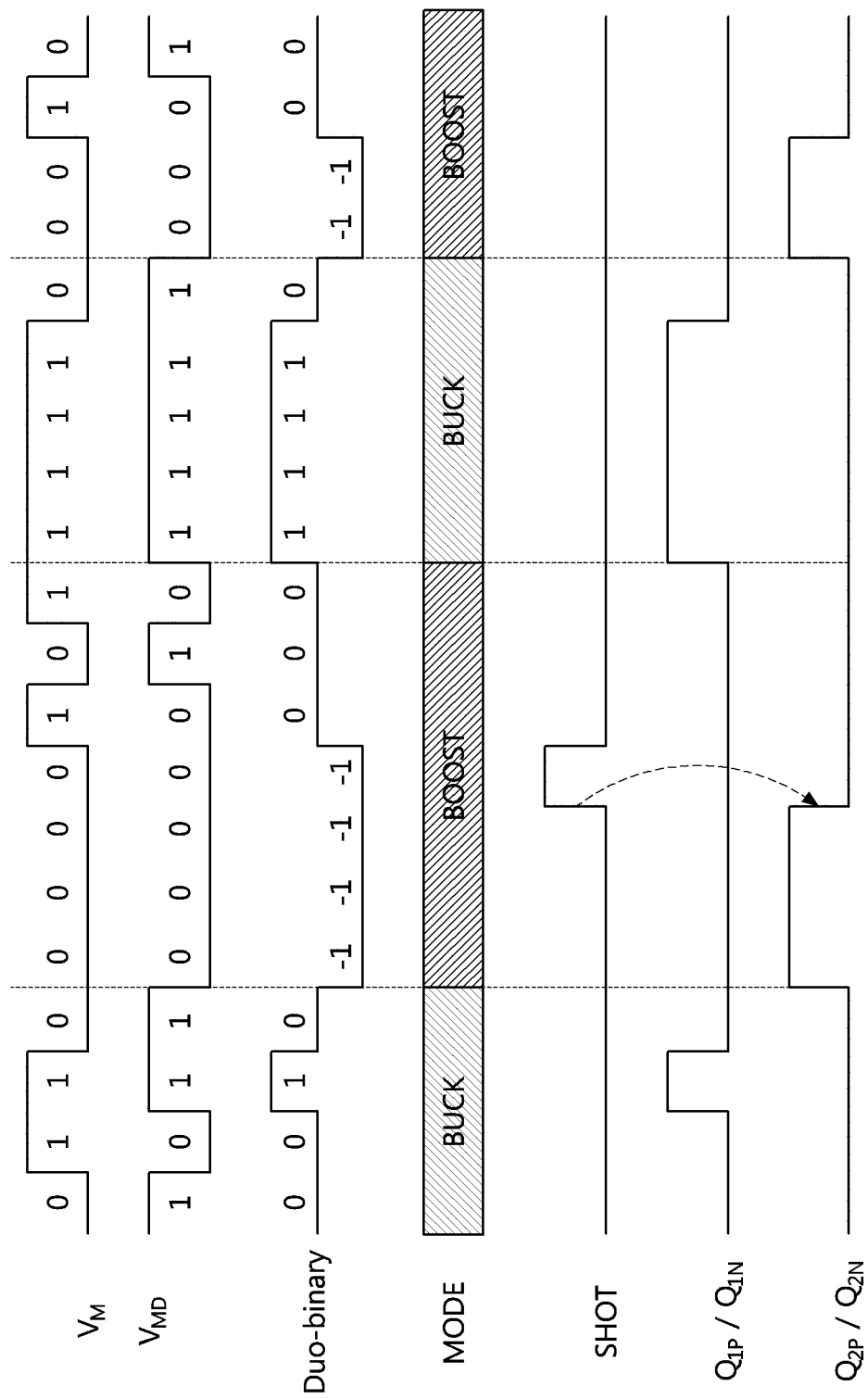
FIG. 7 is a schematic view illustrating an operation of the buck-boost converter using the DSM according to one embodiment of the present invention.

FIG. 7 is a schematic view illustrating the operation of the buck-boost converter using the DSM according to one embodiment of the present invention.

Referring to FIG. 7, the output signal $V_M$ of a case in which the DSM is a 1-bit DSM configured to output the 1-bit digital signal $V_M$, and the delayed signal $V_{MD}$ in which the 1-bit digital signal $V_M$ is delayed by one clock can be seen.

Here, when the 1-bit digital signal $V_M$ and the delayed signal $V_{MD}$ are combined, a duo-binary signal indicating one among −1, 0, and 1 may be generated. In the duo-binary signal, a code +1 may indicate the buck mode, a code −1 may indicate the boost mode, and a code 0 may indicate that a present operation mode has to be maintained. Accordingly, all the switches may be controlled for the buck mode and the boost mode using the output of the 1-bit DSM.

Referring to FIG. 7, in a case in which the code −1 indicating the boost mode is generated, it can be seen that signals applied to gates $Q_{2P}$ and $Q_{2N}$ of the third switch $M_3$ and the fourth switch $M_4$ of FIG. 6 are changed. In addition, in a case in which the code +1 indicating the buck mode is generated, it can be seen that signals applied to gates $Q_{1P}$ and $Q_{1N}$ of the first switch $M_1$ and the second switch $M_2$ of FIG. 6 are changed.

Figure 8:
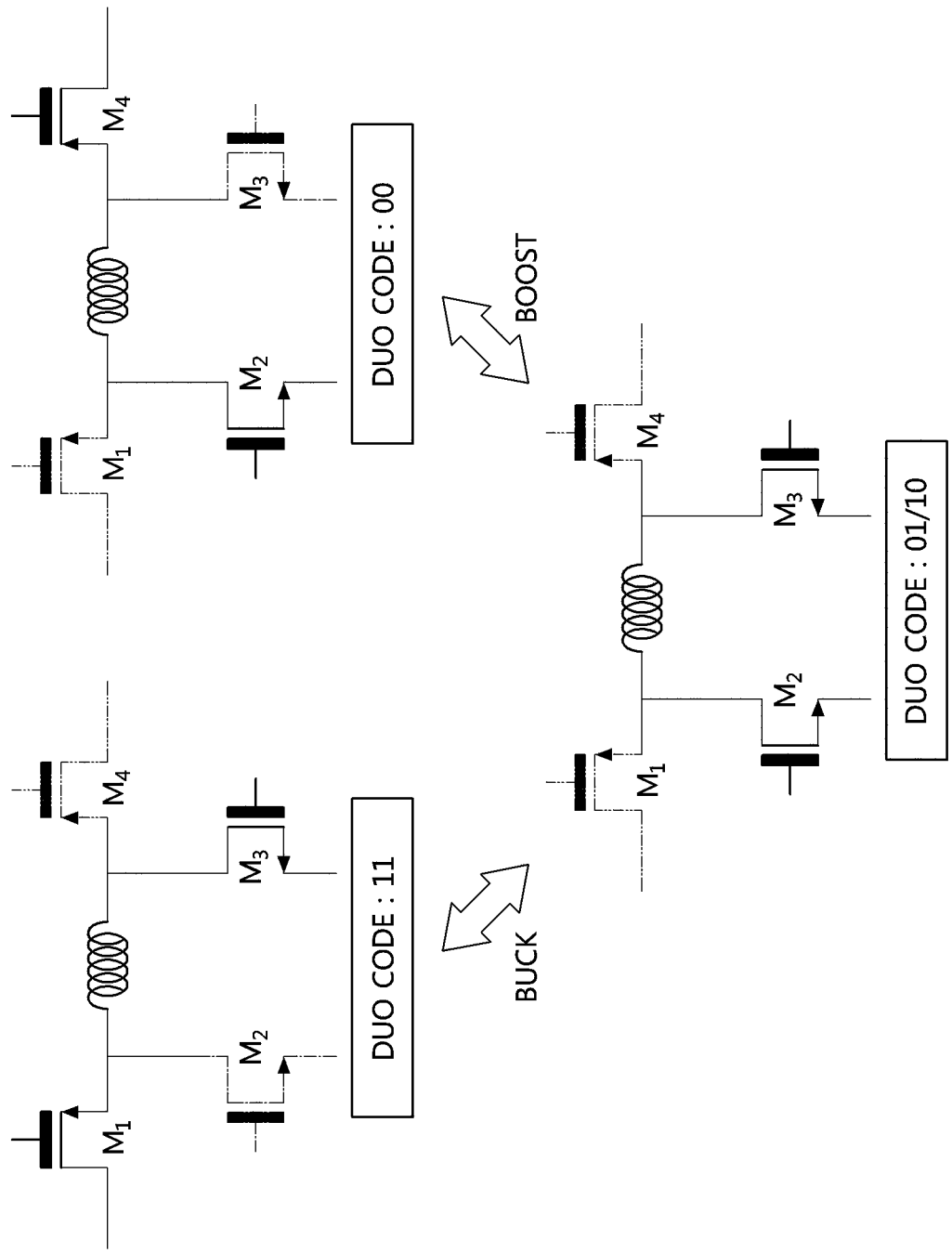
FIG. 8 is a schematic view illustrating switches, operated by a duo-binary code (DUO CODE) according to one embodiment of the present invention.

Meanwhile, in a case in which the buck-boost converter operates in the boost mode, since the output voltage has to be increased, a current has to be charged in the inductor, and thus the first switch and the third switch of FIG. 6 can be operated (see FIG. 8). However, when the first switch and the third switch are operated, since the output and the inductor are separated, energy may not be transmitted to the output even when a large amount of energy is charged in the inductor. In order to prevent such a phenomenon, a SHOT signal illustrated in FIG. 7 may be used.

When the boost mode is generated for a predetermined clock period, the SHOT signal illustrated in FIG. 7 may change the duo-binary signal for a state in which the energy may be forcibly transmitted thereto. Accordingly, when the SHOT signal is generated, the duo-binary signal may be changed into a code +0.

Meanwhile, although the duo-binary signal is described with the codes +1, 0, and −1, when the duo-binary signal is described with a duo-binary code (DUO CODE) each indicating 0 or 1, the codes +1, −1, and 0 may be respectively defined as 11, 00, and 01 or 10, and thus it has to be interpreted that a description according to the binary code also be included therein.

Figure 9:
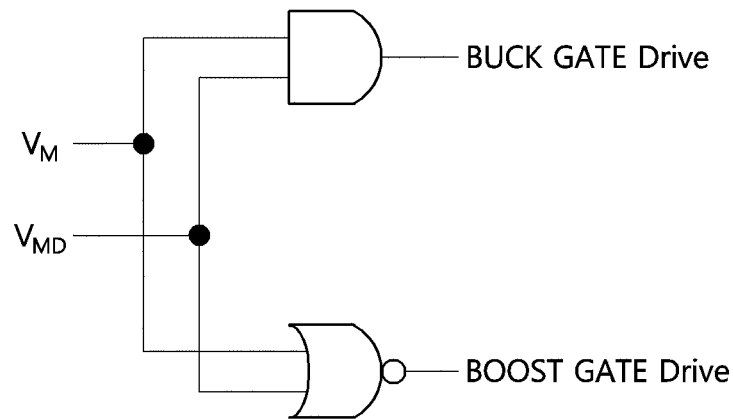
FIG. 9 is a view illustrating an example of a duo-binary encoder configured to generate the duo-binary code according to one embodiment of the present invention.

FIG. 8 is a schematic view illustrating the switches operated by the duo-binary code according to one embodiment of the present invention. FIG. 9 is a view illustrating an example of the duo-binary encoder configured to generate the duo-binary code according to one embodiment of the present invention.

Referring to FIG. 8, in a case in which the DUO CODE is 11 (corresponding to a case in which $V_M=1$, and $V_{MD}=1$ in FIG. 7), since the case means that a signal applied to the DSM through feedback is greater than a reference signal $V_{REF}$, the switches have to be operated such that an inductor current decreases. Accordingly, in the case in which the DUO CODE is 11, the second switch $M_2$ and the fourth switch $M_4$ of FIG. 6 may be operated to perform a buck mode operation.

Meanwhile, in a case in which the DUO CODE is 00 (corresponding to a case in which $V_M=0$ and $V_{MD}=0$ in FIG. 7), since the case means that a signal applied to the DSM through feedback is less than the reference signal Vane the switches have to be operated such that the inductor current increases. Accordingly, in the case in which the DUO CODE is 00, the first switch $M_1$ and the third switch $M_3$ may be operated to perform a boost mode operation.

In addition, in a case in which the DUO CODE is 01 or 10, the first switch $M_1$ and the fourth switch $M_4$ may be operated to maintain a present mode.

When the switches are controlled through the above-described method, since the switches operated in the buck mode and the switches operated in the boost mode can be simultaneously controlled through only the output signal of the 1-bit DSM unlike the conventional case in which two ramp signals, and the comparator are used, a circuit may be more easily formed.

In addition, analyzing the switching operation of FIG. 8, two binary codes are not simultaneously changed in any case. That is, there are no cases in which the DUO CODE is changed from 00 to 11, and in order to change the DUO CODE from 00 to 11, the DUO CODE is inevitably changed to a middle state of 10 or 01 and may be changed to 11. Accordingly, a phenomenon in which a discontinuous point occurs when a mode is changed can be prevented, and thus a ripple in the output voltage can be reduced. Meanwhile, although the duo-binary encoder 240 (see FIG. 6) configured to generate the DUO CODE may be implemented using a finite state machine (FSM), the duo-binary encoder 240 may be simply implemented using an AND gate and a NOR gate as illustrated in FIG. 9.

Referring to FIG. 9, the duo-binary encoder may include an AND gate configured to perform an AND operation on the 1-bit digital signal $V_M$ and the delayed signal $V_{MD}$ to output a signal BUCK GATE Drive for performing the buck mode and a NOR gate configured to perform a NOR operation on the 1-bit digital signal $V_M$ and the delayed signal $V_{MD}$ to output a signal BOOST GATE Drive for performing the boost mode. However, the duo-binary encoder is not limited thereto, and when the logical operation is differently described, the logical operation according to FIG. 9 may also be simply performed using different logical operators.

Figure 10:
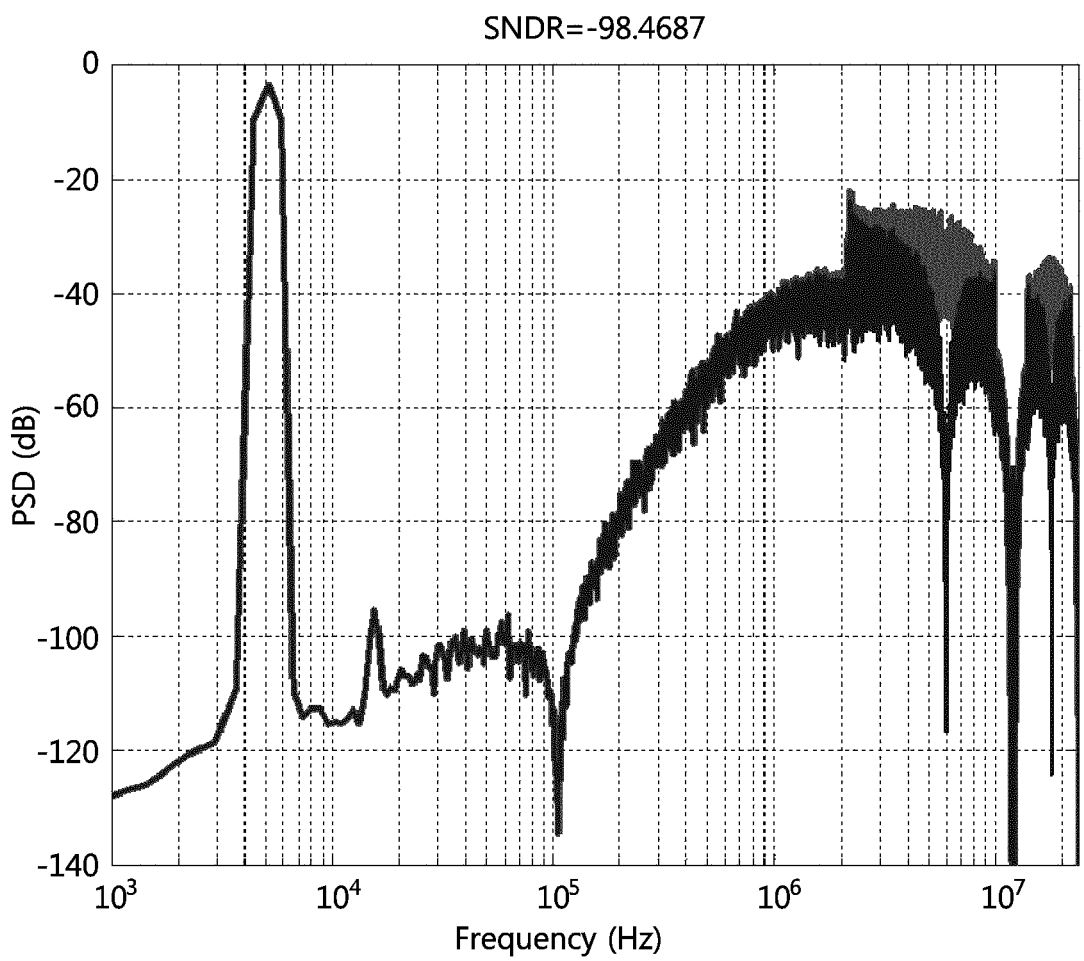
FIG. 10 is a graph of an output spectrum of the DSM to which the duo-binary encoder is applied according to one embodiment of the present invention.
Figure 11:
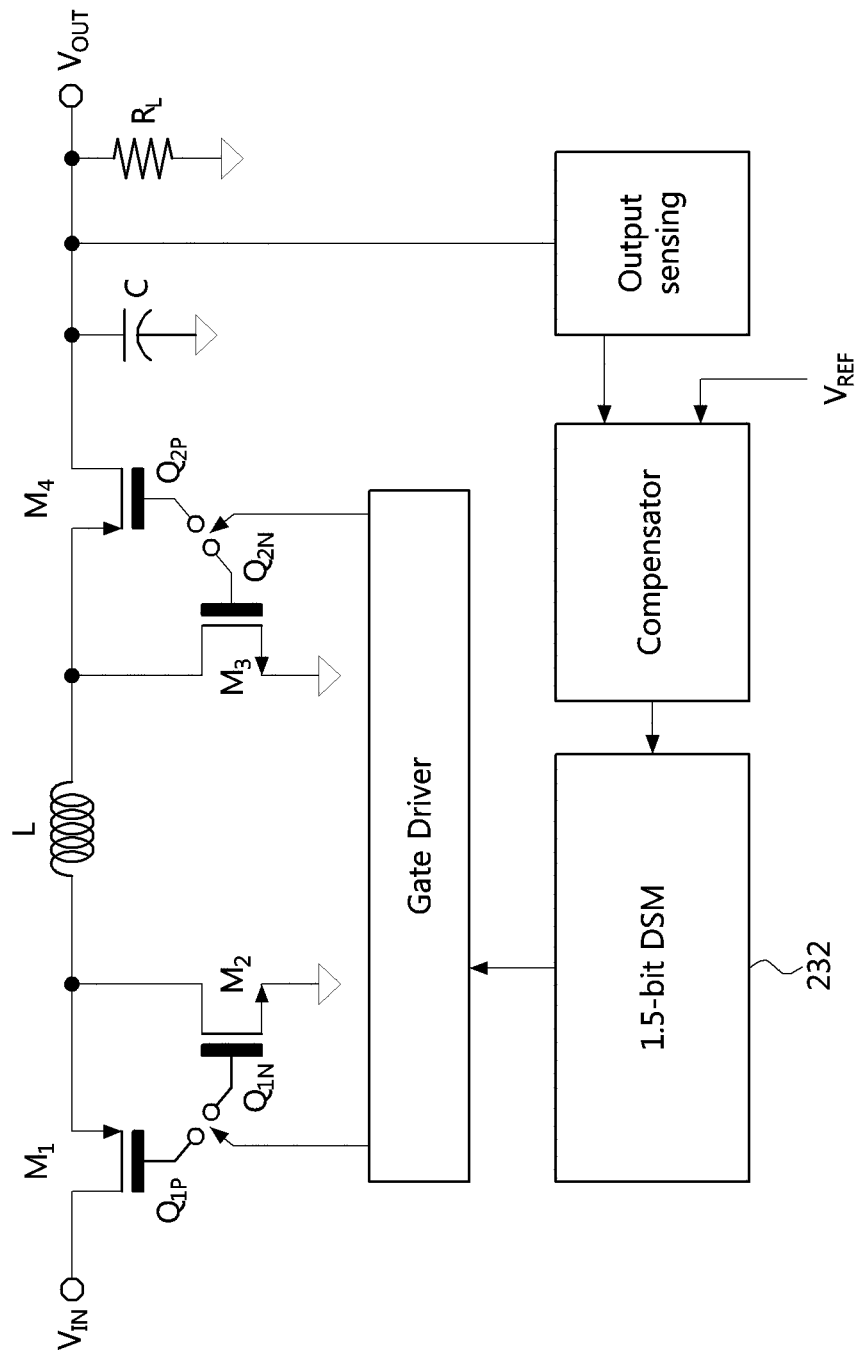
FIG. 11 is a configurational diagram illustrating a buck-boost converter using a 1.5-bit DSM instead of a 1-bit DSM according to one embodiment of the present invention.

FIG. 10 is a graph of an output spectrum of the DSM to which the duo-binary encoder is applied according to one embodiment of the present invention. FIG. 11 is a configurational diagram illustrating a buck-boost converter using a 1.5-bit DSM instead of the 1-bit DSM according to one embodiment of the present invention.

Referring to FIG. 10, a red graph is an output signal (PSD) of a DSM in which there are no duo-binary encoders, and a blue graph is an output signal of a DSM to which the duo-binary encoder is additionally applied.

Specifically, when duo-binary encoding is performed at the output of the DSM, characteristics in an in-band are maintained without change and a bandwidth of an out-of-band signal becomes half as shown in FIG. 10. That is, a signal spectrum of the DSM has a narrow bandwidth feature. In other words, when encoding is performed according to three levels (three switching states of FIG. 8) through the duo-binary encoding, the same characteristics can be obtained even at a lower frequency. Generally, when such a method is used in a communication technology, there is an effect in that a spectral efficiency increases, but when the method is applied to the buck-boost converter using the DSM proposed by the present invention, the same noise shaping, characteristics can be obtained even when a sampling speed of the slower DSM is used, and thus the method can contribute to efficiency improvement.

Meanwhile, since a signal applied to a gate driver through the duo-binary encoder is a 1.5-bit signal, the 1.5-bit DSM may be used instead of the 1-bit DSM and the duo-binary encoder. Accordingly, referring to FIG. 11, it can be seen that the 1.5-bit DSM 232 is applied to the buck-boost converter instead of the 1-bit DSM 230 of FIG. 6.

That is, any DSM having an output with 1-bit or 1.5-bits may be applied to the buck-boost converter using the DSM according to one embodiment of the present invention regardless of a structure (discrete time, continuous-time) of the DSM, an order (first, second, third, and so on) and the like. However, in a case in which the structure and the order are changed, a structure of the compensator and a value of a circuit inside the compensator may be changed to secure a stale operation of the power convertor.

Figure 12:
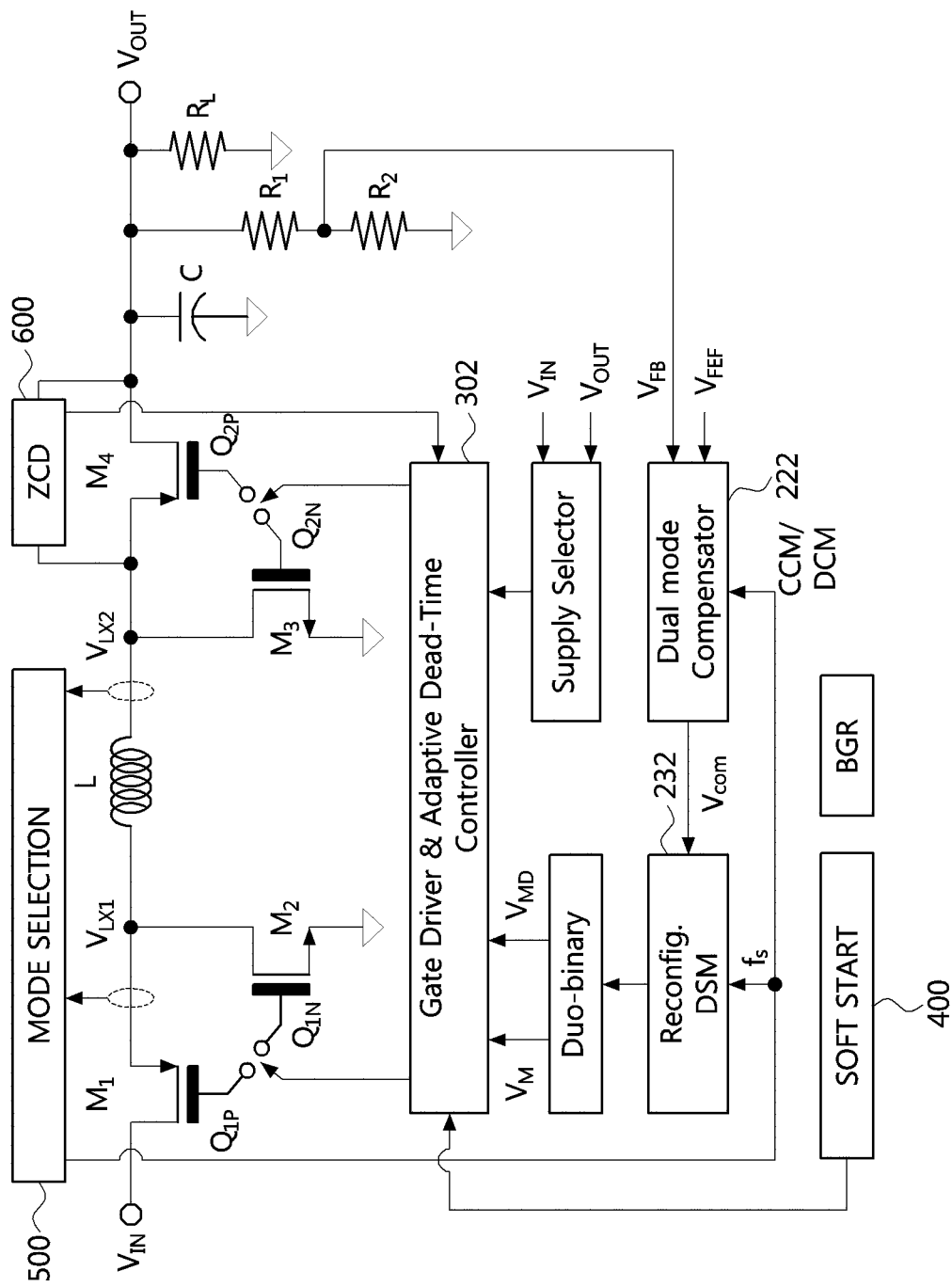
FIG. 12 is a block diagram illustrating a specified buck-boost converter of FIG. 6.

FIG. 12 is a block diagram illustrating a specified buck-boost converter of FIG. 6.

Referring to FIG. 12, a dual mode compensator 222 may be used to compensate a wide range of load current instead of the compensator 220 of FIG. 6. That is, a current is measured at a driving circuit of the buck-boost converter, and it may be determined whether the buck-boost converter operates in a CCM mode or DCM mode on the basis of the measured current. The dual mode compensator 222 may compensate a voltage using different circuits according to the determined conduction mode. When the dual mode compensator 222 is applied to the buck-boost converter, the buck-boost converter can have a wider current driving range.

Meanwhile, the 1-bit DSM 230 of FIG. 6 may be implemented using a reconfigured DSM 232 capable of adaptively changing an order and a sampling frequency. When the reconfigured DSM 232 is used, the order and the sampling frequency of the DSM are raised and the buck-boost converter is used when a load current is high (CCM mode), and the order and the sampling frequency of the DCM is lowered and the buck-boost converter is used when the load current is low (DCM mode), and thus the efficiency of the buck boost converter can be optimized. Here, the reconfigured DSM disclosed in Korean Patent Application No 2017-0009804 "CONTINUOUS DELTA-SIGMA MODULATOR FOR SUPPORTING MULTI MODE" or Korean Patent Application No 2017-0090959 "SWITCH MODE POWER SUPPLIER USING RECONFIGURED DELTA-SIGMA MODULATOR AND METHOD OF DRIVING SAME" may be applied to the buck boost converter, and other DSMs capable of dynamically changing a mode may be used therefor.

In addition, an adaptive dead-time controller 302 may be used instead of the gate driver 300 of FIG. 6. When the adaptive dead-time controller 302 is used, the number of times that body diodes of the second switch $M_2$ and the fourth switch $M_4$ of FIG. 6 are turned on may be reduced. Accordingly, a ripple in an output voltage can be reduced and the improved conversion efficiency can be obtained.

Besides, the buck-boost converter of FIG. 6 or FIG. 12 may be used with various additional circuits such as various protection circuits 400 capable of protecting the buck-boost converter from soft-start, over voltage, and over current for a stable starting, operation, a MODE SELECTION circuit 500 for determining the DCM or CCM, and a zero cross detector (ZCD) circuit 600 for removing a negative current at an inductor during a DCM operation.

Figure 13:
FIG. 13 is a view illustrating a measurement result of the buck-boost converter using the DSM according to one embodiment of the present invention.

FIG. 13 is a view illustrating a measurement result of the buck-boost converter using the DSM according to one embodiment of the present invention.

Referring to FIG. 13, it can be seen that, as an input voltage $V_{IN}$ of the circuit of FIG. 12 is changed (specifically, from 5 V to 2.5 V), the operation mode of the buck-boost converter is automatically changed and the buck-boost converter is operated.

Specifically, in a case in which the input voltage $V_{IN}$ is high, the buck-boost converter operates in the buck mode, and a voltage of $V_{LX1}$ of FIG. 12 decreases according to the input voltage $V_{IN}$. When the input voltage $V_{IN}$ is close to an output voltage $V_{OUT}$ while decreasing to a voltage less than or equal to a predetermined voltage, it can be seen that, the buck-boost converter operates in a buck-boost mode (BB), a voltage of $V_{LX2}$ is automatically changed according to switching operations of switches connected to the $V_{LX2}$ of FIG. 12 which is a voltage terminal. In addition, when the input voltage $V_{IN}$ becomes lower than the output voltage Vow, it can be seen that the voltage of the $V_{LX1}$ is automatically changed according to switching operations of the switches connected to the $V_{LX1}$ of FIG. 12 while the buck-boost converter operates in the boost mode to maintain the output voltage $V_{OUT}$.

Accordingly, in the buck-boost converter using the DSM according to one embodiment of the present invention, since the operation mode is changed according to the output code of the DSM without using two comparators unlike the general non-inverting buck-boost converter, it can be seen that the output voltage Vo is stably maintained. That is, in the case in which the non-inverting buck-boost converter is implemented using the DSM, since the operation mode can be continuously changed, and switching loss and conduction loss can be reduced, the efficiency and performance thereof can be improved.

According to example embodiments of the present invention, since a DSM is used in a case in which a buck-boost converter using a DSM is used, a switching harmonic does not occur, and output ripple characteristics are good due to a high switching frequency.

In addition, since switches for a buck mode and a boost mode are simultaneously controlled using an output signal of the DSM, only one modulator and a compensator are needed to implement the buck-boost converter using the DSM.

In addition, since a mode is automatically determined due to the output signal of the DSM instead of a complex switching control circuit or a comparator, the buck-boost converter using the DSM can be easily implemented.

In addition, since a mode is determined by a digital code according to the output signal of the DSM, there is an advantage in that there are no points of discontinuity.

While the example embodiments of the present invention and their advantages have been described in detail, it should be understood that various changes, substitutions and alterations may be made herein without departing from the scope of the invention.

What is claimed is:

1. A buck-boost converter using a delta-sigma modulator (DSM) comprising:
   a buck-boost mode driving circuit configured to receive an input voltage and output an output voltage according to an operation mode;
   a mode controller configured to sense an output of the buck-boost mode driving circuit and determine the operation mode; and
   a gate driver configured to receive a mode determination signal for determining the operation mode from the mode controller and control switches included in the buck-boost mode driving circuit,
   wherein the mode controller includes:
   a delta-sigma modulator (DSM) configured to generate the mode determination signal with a 1-bit digital signal according to the output of the buck-boost driving circuit; and
   a duo-binary encoder configured to receive the 1-bit digital signal and output the mode determination signal with a binary code.

2. The buck-boost converter of claim 1, wherein the buck-boost mode driving circuit includes a plurality of switches switched to change the output voltage according to the operation mode.

3. The buck-boost converter of claim 1, wherein the buck-boost mode driving circuit includes:
   a first switch in which the input voltage is applied to one end and an inductor is connected to the other end;
   a fourth switch in which one end is connected to the inductor and the other end is connected to a first contact point;
   a second switch in which one end is connected to a contact point between the first switch and the inductor and the other end is connected to the ground;
   a third switch in which one end is connected to a contact point between the inductor and the fourth switch and the other end is connected to the ground;
   a load resistor in which one end is connected to the ground and the other end is connected to the first contact point so that the output voltage is applied; and
   a capacitor connected to the output resistor in parallel.

4. The buck-boost converter of claim 1, wherein the mode controller further includes an output sensor configured to sense the output voltage of the buck-boost mode driving circuit and output a feedback voltage.

5. The buck-boost converter of claim 3, wherein the delta-sigma modulator (DSM) senses a current flowing through the inductor or the load resistor and variably adjusts an order and a sampling frequency.

6. The buck-boost converter of claim 4, wherein the output sensor outputs the feedback voltage by multiplying the output voltage by a preset gain.

7. The buck-boost converter of claim 4, wherein the delta-sigma modulator (DSM) generates a digital signal for adjusting an ON or OFF time of each of the plurality of switches on the basis of the feedback voltage.

8. The buck-boost converter of claim 7, wherein the mode controller includes a compensator configured to compensate the feedback voltage on the basis of a reference voltage and transmit the compensated feedback voltage to an input of the delta-sigma modulator (DSM).

9. The buck-boost converter of claim 7, wherein the duo-binary encoder combines the 1-bit digital signal and a delayed signal in which the 1-bit digital signal is delayed by one clock to generate a binary code indicating one among 00, 01, 10, and 11, and outputs the mode determination signal based on the generated binary code.

10. The buck-boost converter of claim 8, wherein the compensator includes a dual mode compensator in which independent circuits perform compensation of a discontinuous conduction mode (DCM) and compensation of a continuous conduction mode (CCM).

11. The buck-boost converter of claim 9, wherein the duo-binary encoder includes:
an AND gate configured to perform an AND operation on the 1-bit digital signal and the delayed signal and output a signal for driving a buck mode; and
a NOR gate configured to perform a NOR operation on the 1-bit digital signal and the delayed signal and output a signal for driving a boost mode.

12. The buck-boost converter of claim 9, wherein, when the binary code is 11, the gate driver controls the plurality of switches such that the buck-boost driving circuit operates in a buck mode.

13. The buck-boost converter of claim 9, wherein, when the binary code is 10 or 01, the gate driver controls the plurality of switches such that the buck-boost driving circuit maintains an operating buck-boost mode.

14. The buck-boost converter of claim 9, wherein, when the binary code is 00, the gate driver controls the plurality of switches such that the buck-boost driving circuit operates in a boost mode.

15. A mode control circuit which controls a buck-boost mode driving circuit configured to receive an input voltage and output an output voltage according to an operation mode, the mode control circuit for the buck-boost mode driving circuit comprising:
an output sensor configured to sense an output voltage of the buck-boost mode driving circuit and output a feedback voltage;
a compensator configured to compensate the feedback voltage on the basis of a reference voltage and output the compensated feedback voltage;
a delta-sigma modulator (DSM) configured to generate a 1-bit digital signal for determining the operation mode on the basis of an output signal of the compensator; and
a duo-binary encoder configured to receive the 1-bit digital signal and output the 1-bit digital signal with a binary code.

16. The mode control circuit of claim 15, wherein the duo-binary encoder combines the 1-bit digital signal and a delayed signal in which the 1-bit digital signal is delayed by one clock to generate a binary code indicating one among 00, 01, 10, and 11.

* * * * *